United States Patent [19]
Hult et al.

[11] Patent Number: 5,271,156
[45] Date of Patent: Dec. 21, 1993

[54] BLADE PROTECTOR FOR CLEARING MACHINE

[75] Inventors: Bror Hult; Lennart Linder, both of Filipstad, Sweden

[73] Assignee: FMG Timberjack AB, Sweden

[21] Appl. No.: 920,503

[22] PCT Filed: Feb. 22, 1991

[86] PCT No.: PCT/SE91/00142
§ 371 Date: Aug. 21, 1992
§ 102(e) Date: Aug. 21, 1992

[87] PCT Pub. No.: WO91/12941
PCT Pub. Date: Sep. 5, 1991

[30] Foreign Application Priority Data
Feb. 23, 1990 [SE] Sweden ............... 9000657

[51] Int. Cl.⁵ ............... B27G 19/04; A01D 34/84; A01G 23/08
[52] U.S. Cl. ............... 30/276; 30/278; 30/347; 56/12.7; 56/17.4; 144/34 R
[58] Field of Search ............... 56/12.3, 12.5, 12.7, 56/17.4, 255, 295, 320.1, 320.2; 30/167, 276, 285, 286, 347; 144/3 D, 34 R, 336

[56] References Cited
U.S. PATENT DOCUMENTS

| | | | |
|---|---|---|---|
| 2,532,982 | 12/1950 | De Young | 30/167 |
| 4,736,573 | 4/1988 | Seck | 56/17.4 |
| 5,144,748 | 9/1992 | Hult | 144/34 R |

FOREIGN PATENT DOCUMENTS
1548806 12/1968 France .

Primary Examiner—W. Donald Bray
Attorney, Agent, or Firm—Nixon & Vanderhye

[57] ABSTRACT

The invention relates to a cutter guard (13, 14) in clearing assemblies (1) provided with a cutter (3) mounted on a shaft (6) and rotatable by means of a motor (11), said shaft (6) being carried in a body (8), the guard comprising a hub section (13) provided in association with the cutter (3) and essentially coaxial with the shaft (6), the hub section (13) having a diameter which is less than the diameter of the rotatable cutter (3) and carrying a plurality of fixed arms (14) which extend outwards beyond the periphery of the cutter (3). The hub section (13) is arranged freely rotatable in relation to the body (8) and those parts of the arms (14) extending beyond the outermost periphery of the cutter (3) are provided with a surface facing in a direction opposite the rotational direction of the cutter (3) and extending up above the plane of the top surface of the cutter as well as to or below the plane of the bottom surface of the cutter (3), said arm surface having a radial extension arranged such that all tangents which can be drawn from the outermost periphery of the cutter between adjacent arms will cut that of the surfaces which is located on that of the two arms which lies rearmost, as viewed in the rotational direction of the cutter, the arms furthermore being formed such that radial movement along the surface of a particle or the like leaving the periphery of the cutter (3) tangentially and hitting the surface will be opposed.

5 Claims, 3 Drawing Sheets

BLADE PROTECTOR FOR CLEARING MACHINE

TECHNICAL FIELD OF THE INVENTION

The invention relates to a cutter guard in clearing assemblies which are provided with a cutter mounted on a shaft and rotatable by means of a motor, the shaft being carried in a body. Such assemblies are often mounted on an implement arm or beam, e.g. on a forest machine, and used for clearing bushes and shrubbery.

BACKGROUND OF THE INVENTION

In clearing forest, clearing tools have previously been used which normally are mounted on a comparatively long, parallelly guided beam or jib mounted on a forest machine and swingable about its supporting point on the machine. Furthermore, the beam can be moved outwardly from and inwardly towards the machine, in doing which the clearing tool at the end of the beam is maintained on a constant level thanks to the parallel guidance of the beam. The constant level can usually be adjusted. As clearing tool a disc has been used, rotatably driven by a motor, pivotally secured knives or beaters being provided on the periphery of said disc. The knives or beaters will reach a comparatively high speed on account of the large diameter and high rotational speed of the disc, usually about 1500 revolutions per minute (RPM). Moreover, as the knives or beating tools have to be comparatively heavy in order to operate in the desired manner their total kinetic energy will be high. If the beaters strike objects as rocks and pieces of woods these could therefore be thrown far away from the assembly at a high speed, as it is almost impossible to mount a completely covering guard around the rotating disc because, if so, the beaters would not get in touch with the vegetation to be cleared. This device thus requires a very great safety distance, up to 100 m. As the machine itself is of course situated within the safety distance the assembly must also be provided with a guard on the side facing the operator, which means that the assembly only can clear when it is moved outwardly from the machine, or laterally, which is a great disadvantage. A further disadvantage is the fact that it is hard to raise the RPM and thus the capacity of the assembly, as the beaters or knives can then be exposed to such large forces that they may be torn loose. Hence, this previously used device is thus impaired by certain defects.

In an attempt to provide an assembly which is not defective in this way it has been proposed to use a rotating cutter having saw teeth instead of a rotating disc provided with beaters or knives. Such a structure will eliminate in practice the risk of objects being through out from the assembly, which brings with it that the safety distance can be reduced to more normal values. However, the cutter must be protected against contact with larger rocks and the like, as the cutter, in contrast to the pivotally mounted beaters or knives, does not yield upon contact with solid objects. Thus one object of the invention is to provide a guard for the cutter.

Some solutions of this problem can be found in, for example, U.S. Pat. Nos. 4,736,573, 2,532,982 and FR-A-1 548 806, according to which the cutter is protected by means of fixed arms extending radially from the center of the cutter. These known devices are intended, however, for lawn-mowing, hedge trimming etc. and the set of problems and technical solutions which form the basis of these previously known devices cannot quite simply be applied to assemblies for clearing forest, as the properties of the types of vegetation concerned are essentially unlike, primarily with respect to size and resiliency, which makes the demands upon the design of the equipment significantly different.

Moreover, in certain cases, above all when large cutters are concerned which rotate at a comparatively high RPM and/or cutters having a few, large, heavy teeth, it can also be desirable to prevent that objects, e.g. parts coming loose from the cutter, are thrown out from the clearing assembly.

A further object of the invention is thus to provide protective means against objects being thrown out from the clearing assembly.

BASIC CONCEPT OF THE INVENTION

These objects are attained by means of a cutter guard comprising a hub section of a diameter less than the diameter of the rotatable cutter, which guard is provided essentially coaxial with the axis of rotation of the cutter and is freely rotatably in relation to the cutter, a number of fixed arms being secured to the hub section and extending outwards beyond the edge of the cutter.

Furthermore, those parts of the arms which are situated beyond the outermost periphery of the cutter are provided with a surface facing in a direction opposite the rotational direction of the cutter and extending up above the plane of the top surface of the cutter as well as to and below the plane of the bottom surface of the cutter, said surface having a radial extension selected such that all tangents which can be drawn from the outermost periphery of the cutter between two adjacent arms will cut that of the surfaces which is located on that of the two arms which lies rearmost as viewed in the rotational direction of the cutter. Furthermore, the arms are designed such that they will oppose radial movement along the plate of a particle or the like hitting the plate tangentially from the periphery of the cutter.

SHORT DESCRIPTION OF THE ANNEXED DRAWINGS

DETAILED DESCRIPTION OF A PREFERRED EMBODIMENT OF THE INVENTION

Figure 1:
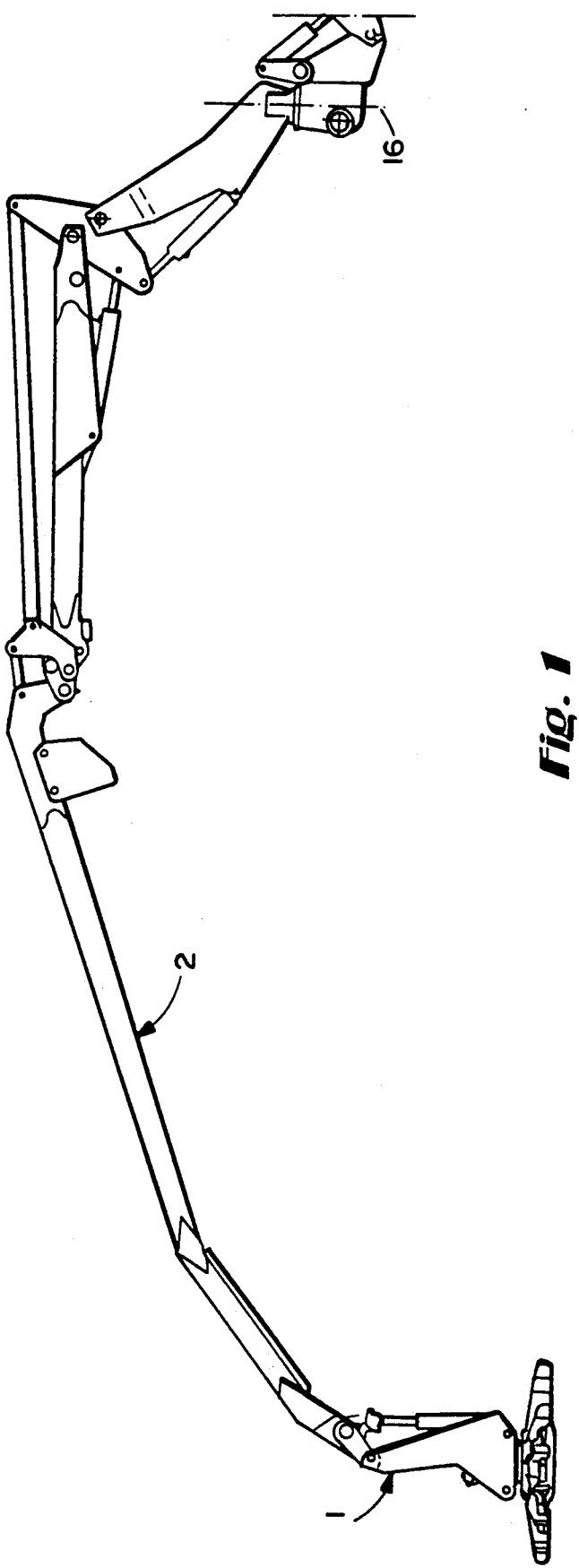
FIG. 1 shows a clearing assembly mounted on a parallelly guided crane beam or jib.

FIG. 1 illustrates how the clearing assembly, here as a whole designated 1, can be provided on a parallelly operated crane beam or jib, designated 2 in its entirety and mounted on a conventional forest machine, not shown. As can be seen from the drawing the beam can be swung about a vertical axis 6 associated with the machine as well as towards and away from the machine. As a consequence of the parallel steering of the beam the clearing assembly will follow, when moved outwardly away from the machine or inwardly towards the machine, a rectilinear path which can be adjusted parallel to the ground. The beam per se does not form any part of the invention and will therefore not be disclosed in any detail here.

Figure 2:
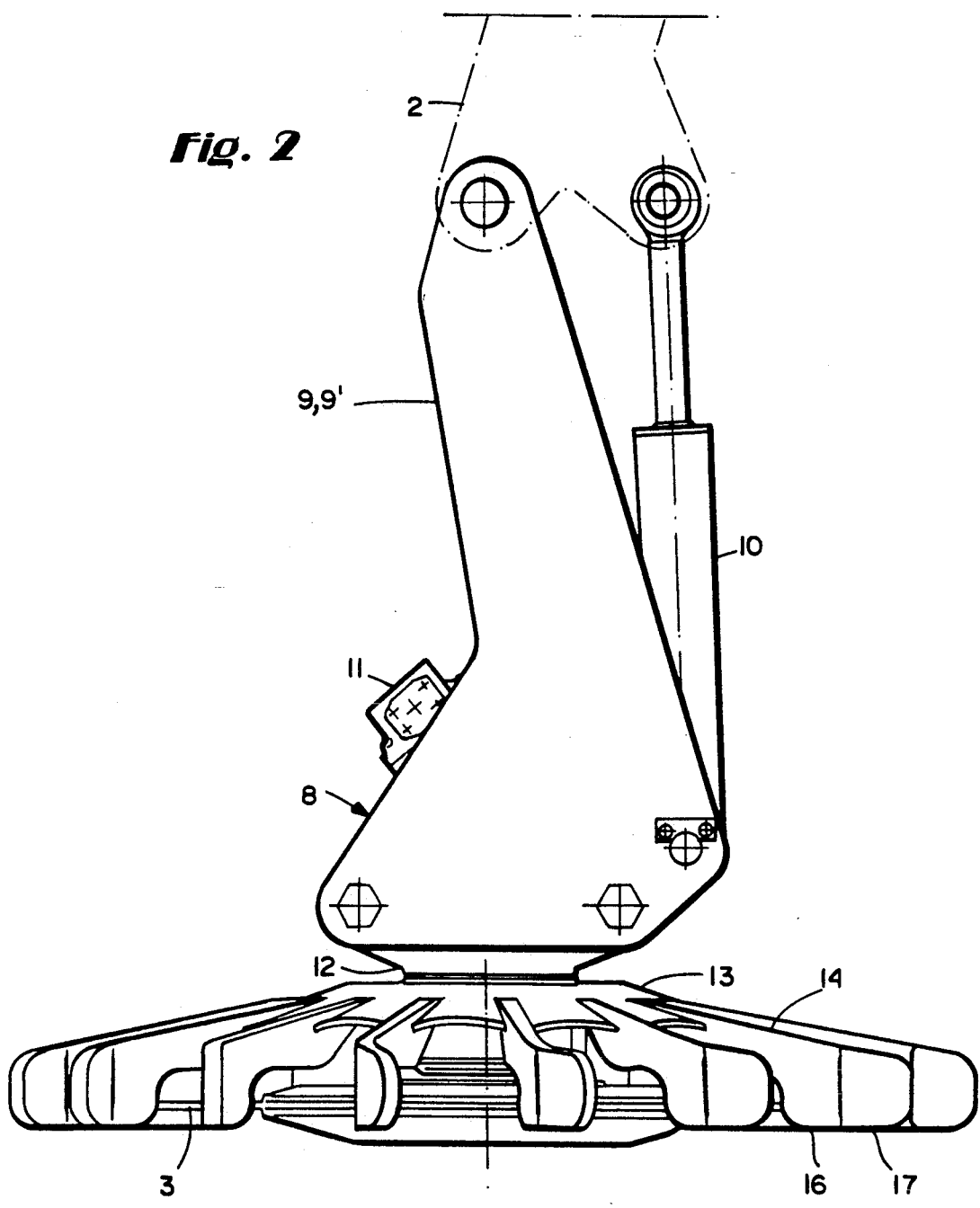
FIG. 2 shows, in elevation, the clearing assembly disconnected from the crane beam.
Figure 3:
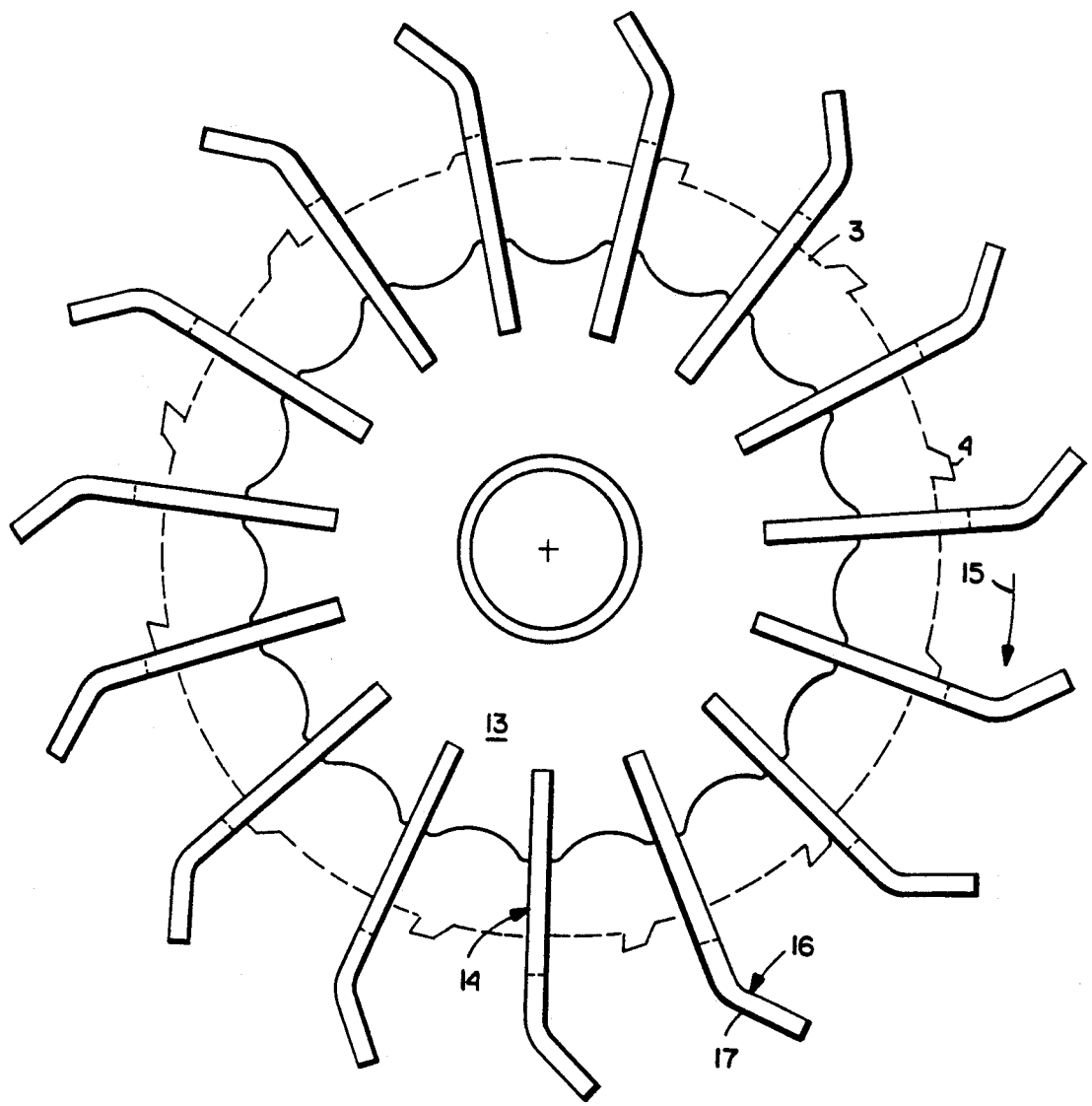
FIG. 3 shows, in plan, the guard proper, the position of the cutter in relation to the guard being indicated by dashed lines.

FIGS. 2 and 3 show the clearing assembly and the cutter blade guard in greater detail. The cutter blade 3 is provided with saw teeth 4 and is mounted by means of bolts, not shown, on a rotatable shaft which is carried in a body 8 by means of antifriction bearings. The body 8 comprises a pair of parts 9', 9" which extend upwardly and are pivoted at their upper ends to the end of the beam 2. Between the body 8 and the crane beam 2 also a hydraulic cylinder 10 extends for the angular adjustment of the clearing assembly. Between the two body parts 9, 9" a hydraulic motor 11 is provided which drives the cutter blade 3 by way of the rotatable shaft. Feeding of the hydraulic motor 11 is carried out in the usual way by means of hydraulic conduits, not shown here. The body 8 also comprises a downwardly projecting part 12 wherein bearing means are provided for supporting the rotatable shaft. A hub section 13 is provided on the outside of this projecting part 12, freely rotatable thereon. The hub section 13 has a diameter less than the diameter of the cutter blade. On the hub section 13 a plurality of fixed arms 14 are secured which are spaced evenly along the periphery of the hub section, thus at the same angular distance from each other. The arms extend beyond the periphery of the cutter blade.

Those parts of the arms 14 which extend beyond the cutter 3 are formed as surfaces or plates 16 oriented essentially perpendicular to the plane of the cutter 3. The plates 16 extend up above the plane of the top side of the cutter 3 and to or below the plane of the bottom side of the cutter. Where the plates extend below the cutter 3 they will also protect the cutter 3 from contacting the ground. The radial extension of the plates 16 is selected such that all tangents which can be drawn from the outermost periphery of the cutter between two adjacent arms 14 will cut the plate 16 on that of the two arms 14 which is located rearmost, as viewed in the rotational direction of the cutter, that is, so that a particle or fragment which comes loose or is thrown out from the periphery of the cutter 3 and thus is ejected along a tangential path, will hit the plate 16. As the hub section 13, upon which the arms 14 are secured, is rotatably carried in the body, said plate 16, having together with the hub portion 13 and the rest of the arms 14 a comparatively large mass, will yield in the rotational direction 15 of the cutter 3, thereby absorbing substantially the whole kinetic energy from the particle or fragment.

This means that the particle will be slowed down and fall to the ground instead of being ejected at high speed from the clearing assembly.

By the outermost periphery of the cutter 3 it is here aimed at the circular orbit of the point or points which are located outermost on the cutter 3, as measured from the centre of the cutter.

Furthermore, the plate 16 is formed in order to counteract movement radially along the plate of a particle or fragment which is thrown tangentially by the cutter towards the plate. In the present, preferred embodiment the plate is formed such that its outer half 17 is bent backwards, against the rotational direction of the cutter, so that the outer angle formed between the outermost tangent possible to draw from the periphery of the cutter between the two arms and the outer half 17 of the plate 16 will be 90° or less.

In the ideal case however, the plate is curved in such a way that all tangents which can be drawn from the periphery of the cutter 3 in the rotational direction between two arms 14 will kit the plate 16 at right angle, that is, the plate 16 is curved as an involute of the outermost circular periphery of the cutter, to the effect that the particle will not obtain any component of movement directed along the plate. As a matter of course the plate 16 can also be provided with traversing flanges or the like, which are essentially perpendicular to the plane of the cutter and will prevent a particle from sliding outwards along the plate or from bouncing outwardly. It is also conceivable that the plate be formed so as to exhibit a high friction on the side facing in the direction opposite the rotational direction of the cutter.

Also, as seen in the figure the number of arms can be selected comparatively great and in the preferred embodiment, such as illustrated in the annexed drawings, the number of arms has been selected fifteen. This means that the tangents which are directed in the rotational direction of the cutter will hit the plate 16 at an angle only very little deviating from 90°, which means, in principle, that the risk is small that a particle or fragment, travelling of course in the direction of these tangents, will bounce outwardly from the cutter guard, as the particle also in this case will obtain a very small component of movement directed along the plate 16. That this solution is conceivable is due to the fact that the diameter of the trees etc. to be cleared normally is comparatively small as compared with the effective diameter of the clearing assembly.

As shown in FIG. 2 the cutter guard is advantageously arranged such that it slopes somewhat downwards from the center of the hub section in order that chips, twigs etc. falling upon the guard will slide down and fall off therefrom.

The part of the lower edge of the arms 14 located above the cutter 3 is parallel thereto and lies comparatively close to the cutter. This will reduce the risk of chips, twigs or the like getting caught between the arms 14 and the cutter 3.

The direction of rotation is indicated by the arrow 15 in FIG. 3. The distance between the arms 14 is selected such that it allows the vegetation to be cleared to enter and reach the cutter between two adjacent arms and to be able to reach all the way to the hub section 13. Suitably the hub section is semi-circularly recessed between two adjacent arms 14. At the same time the distance between two adjacent arms is also selected such that larger stones or rocks, and also larger trees which should not be hurt by the cutter, cannot reach so far in between two adjacent arms that they will contact the cutter. Here it may be pointed out that on the level where the clearing assembly is normally moving over the ground when clearing there are seldom rocks or similar items which are so narrow that they correspond to the thickness of vegetation ready for clearing. If any of the arms should hit straightly, for example, a small tree to be cleared, the whole guard can yield thanks to the fact that the hub section 13 is rotatably carried in the body part 8. This process is facilitated if the outer portions of the arms are bent laterally somewhat, for instance as shown in the preferred embodiment discussed above.

Thanks to the symmetrical structure of the cutter guard the cutter can operate without limitation in all directions of movements parallel to the ground. As the risk of particles being thrown out from the cutter is small, no specific guard is necessary on the side of the clearing assembly facing the machine. The cutter in combination with the cutter guard will thus offer a very simple and effective solution of the problems which up to now have been inherent in devices for mechanical clearing. In principle the rotational speed of the cutter is not limited upwards (or downwards) but can be selected freely according to circumstances prevailing. A usual speed is about 2200 revolutions per minute (RPM).

CONCEIVABLE MODIFICATIONS OF THE INVENTION

As a matter of course the invention can be modified in many other ways within the scope of the accompanying patent claims. As for example, the assembly can be mounted on a beam or jib of optional type. Furthermore, any kind of motor can be used for driving the cutter. The motor used can e.g. be driven by gasoline or be operated hydraulically, electrically, pneumatically or in some other suitable way. Neither is it necessary to arrange the motor in direct connection with the cutter. The cutter used can of course be of any suitable type. In principle it is also conceiveable that the cutter guard be used in the type of cutter discussed initially and which comprises a rotating disc with beaters pivotally secured along the periphery. As these beaters must have a comparatively large mass in order to operate as intended, however, in this case heavy demands will be made upon the design and dimensioning of the guard.

Furthermore, it should be pointed out here that with respect to the methods discussed above for designing the arms 14 so as to oppose movement along the arm surface of a particle hitting the surface, these methods can be optionally combined except for the case where the surface has been bent, which case of course cannot be combined with the case where the surface has been formed as an involute.

We claim:

1. In a clearing tool assembly provided with a circular cutter mounted on a shaft and rotatable in one direction by means of a motor, the shaft being carried in a body, a cutter guard comprising a hub section located substantially coaxially with the shaft and located above the cutter, said hub section having a diameter which is less than the diameter of the cutter and carrying a plurality of arms which extend radially outwards beyond the periphery of the cutter, and wherein said hub section is arranged freely rotatable in relation to the body and wherein portions of the arms which extend beyond the outermost periphery of the cutter are each provided with a surface facing in a direction opposite the one direction and extending up above a plane containing a top surface of the cutter as well as to or below a plane containing a bottom surface of the cutter, each said arm surface having a radial extension arranged such that all tangents which can be drawn from an outermost periphery of the cutter between two adjacent of said arms will intersect that arm surface of said two adjacent arms which lies rearmost, as viewed in the rotational direction of the cutter, each of said arms further being formed such that radial movement of a particle along a respective arm surface leaving the periphery of the cutter tangentially will be opposed by said respective arm surface.

2. The cutter guard according to claim 1, wherein said arm surface is one face of a plate which is formed integral with the respective arms.

3. The cutter guard according to claim 1, wherein an outer half of the plate is bent backwards, opposite said one direction of the cutter in such a way that the outer angle formed between the outermost tangent which can be drawn from the periphery of the cutter between said two adjacent arms and the part of the outer half (17) of the plate (16) which lies outside said tangent is 90° or less.

4. A cutter guard according to claim 1, wherein each said surface is curved as the involute of the outermost, circular periphery of the cutter.

5. A cutter guard according to claim 1 wherein the number of arms is between 14 and 16.

* * * * *